United States Patent

[11] 3,581,119

| [72] | Inventor | Gary Grundy |
| | | Rosemount, Minn. |
| [21] | Appl. No. | 814,335 |
| [22] | Filed | Apr. 8, 1969 |
| [45] | Patented | May 25, 1971 |
| [73] | Assignee | The United States of America as represented by the Secretary of the Air Force |

[54] PHOTO-CURRENT DIVERTER
3 Claims, 3 Drawing Figs.

[52] U.S. Cl. .................................................. 307/288,
307/255, 317/33, 328/4, 328/8, 328/22
[51] Int. Cl. ........................................................ H03k 17/16
[50] Field of Search ........................................... 307/255,
288; 317/33; 323/4, 8, 22 (T)

[56] References Cited
UNITED STATES PATENTS

| 2,890,353 | 6/1959 | Van Overbeek et al. | 317/33X |
| 3,201,593 | 8/1965 | Anderson et al. | 307/288X |
| 3,235,750 | 2/1966 | Anderson et al. | 307/288X |
| 3,271,528 | 9/1966 | Vallese | 179/170 |
| 3,292,005 | 12/1966 | Lee | 307/288X |
| 3,319,086 | 5/1967 | Seening Yee | 307/288 |
| 3,512,047 | 5/1970 | Garde | 317/33 |

FOREIGN PATENTS

| 1,173,522 | 7/1964 | Germany | 307/255 |

*Primary Examiner*—Donald D. Forrer
*Assistant Examiner*—R. C. Woodbridge
*Attorneys*—Harry A. Herbert, Jr. and John J. Mulrooney

ABSTRACT: A transistorized clamping circuit is useful to quickly and efficiently divert radiation induced photocurrents to prevent damage to semiconductor systems. Through the use of a low power, fast turn-on transistor and a high power, slow turn-on transistor, the circuit is able to divert both the initial photocurrent surge and the continuing high photocurrent generated by the radiation.

PATENTED MAY 25 1971  3,581,119

INVENTOR.
GARY GRUNDY
BY Harry A. Herbert Jr
John J. Mulrooney
ATTORNEYS

PHOTO-CURRENT DIVERTER

BACKGROUND OF THE INVENTION

1. Field of the Invention

This invention relates to semiconductor circuits and, in particular, to a fast turn-on, high current conducting clamping circuit for diverting radiation induced photocurrents.

2. Description of the Prior Art

Semiconductors in general, and transistors in particular, are sensitive to the ionizing effects of gamma radiation. Gamma rays produce extra hole-electron pairs that flow as photocurrents because of the charge-segregating action of the electric fields across the PN junctions. The generation of excess electron-hole pairs in semiconductors is of paramount concern because the pairs move through the circuit as current. When current is produced near the junctions which control semiconductor device action, a larger secondary photocurrent is produced by the current-amplifying mechanism of the device. Momentary saturation of the device can occur which could have an adverse effect on circuit operation. For example, the excess charge could be drained through the power supply, producing unwanted voltage and signal transients that could be transmitted down a computer memory line and thereby destroy stored information. Also, the amplitude of such a voltage transient would depend on radiation intensity and circuit impedance; the duration depends on circuit time constants. The transient can disrupt system operation by swamping out a digital clock pulse, or by spuriously pulsing a digital circuit.

A prior art method of handling photocurrents in transistorized equipment has been the use of current-limiting resistors between the transistors and the computer circuits which they serve. The chief drawback to this method is that much care must be taken to insure that the resistors do not introduce phase shifts, which could cause oscillations in the circuits even in the absence of radiation photocurrents. In integrated circuit equipment, the photocurrents can be adequately drained off by an additional substrate bias connection.

SUMMARY OF THE INVENTION

A low power, fast turn-on transistor and a high power, slow turn-on complimentary transistor comprise a circuit for diverting radiation induced photocurrents. A single command pulse turns on both transistors but the low-power transistor completes its turn-on first and will divert most of the initial current. As the photocurrent increases and more time has elapsed the high-power transistor completes its turn-on and diverts a larger part of the photocurrent.

BRIEF DESCRIPTION OF THE DRAWINGS

FIG. I is a block diagram which illustrates one method of using the photocurrent diverter of the present invention.

FIG. II is a schematic diagram of the photocurrent diverter in accordance with the present invention.

FIG. III is a family of current versus time curves showing the current which flows in the low-power transistor, the high-power transistor, and the composite current which flows in the photocurrent diverter.

DESCRIPTION OF THE PREFERRED EMBODIMENT

Referring to FIG. I, the block diagram illustrates one method for using the photocurrent divider of the present invention. The block diagram illustrates a system comprising a computer memory A which is controlled by transistorized circuits B. Power supply C energizes the transistor circuit B. The photocurrent diverter circuit D is connected to act as a clamping circuit. In operation, if a critical level of radiation should occur, it would be detected by detector E which would generate a command pulse and thereby activate photocurrent diverter D which would clamp any radiation induced photocurrent to ground. The effect is to protect the computer memory from destruction by the photocurrents.

Figure 1:
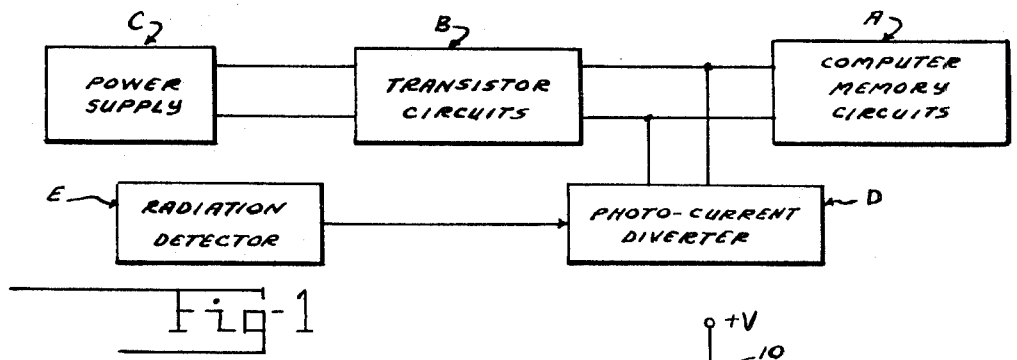
Figure 2:
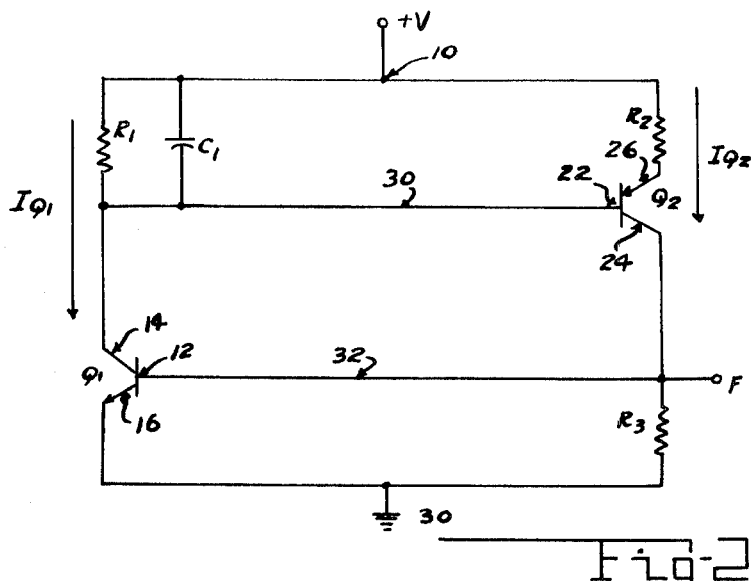

Referring now to FIG. 2, an input F is connected to the base 12 of NPN transistor $Q_1$ and to the collector 24 of PNP transistor $Q_2$. An R-C network comprising a parallel combination of resistor $R_1$ and capacitor $C_1$ is connected between the junction 10 and the collector 14 of $Q_1$. The emitter 16 of $Q_1$ is connected directly to ground terminal 30. The emitter 26 of $Q_2$ is connected through resistor $R_2$ to junction 10 and the collector 24 is connected through $R_3$ to ground terminal 30. The base 22 of $Q_2$ is connected through line 30 to the collector 14 of $Q_1$ and the base 12 of $Q_1$ is connected through line 32 to the collector 24 of $Q_2$.

Transistor $Q_1$ is preferably a low-power device having a very fast turn-on time and the ability to sustain high currents for short periods of time. Complementary transistor $Q_2$ is preferably a high-power device which will inherently be slow in turning on and which will be able to sustain high currents for long periods of time.

In operation, for example, the photocurrent diverter circuit is connected in parallel with the output of any circuits which may be damaged by radiation induced photocurrents. When an on-command pulse, for example from a radiation detector, arrives at input F, both $Q_1$ and $Q_2$ are turned on to divert the photocurrent which appears at junction 10.

Figure 3:
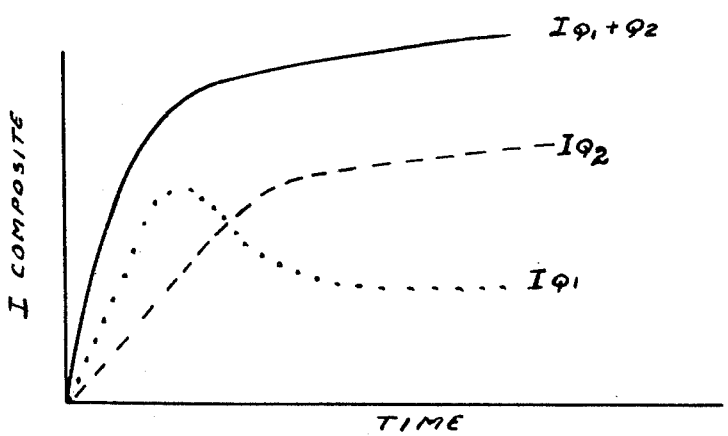

Although the command pulse is sufficient to turn both $Q_1$ and $Q_2$ on, the low-power transistor $Q_1$ has a faster turn-on time than $Q_2$ and therefore begins to conduct before $Q_2$. Immediately after turn-on, $Q_1$ draws photocurrent very rapidly from the junction 10 through $C_1$ because of the low impedance path which $C_1$ presents for a fast pulse. Thereafter, as $C_1$ becomes charged, it is not able to pass as much current and the current through $Q_1$ drops off to a steady state value. This rise and fall of the current drawn by $Q_1$ is illustrated in FIG. 3 as $IQ_1$. Thus, the fast rising photocurrent is drawn very quickly through $Q_1$ and eventually drops to a steady state value of $V/R_1$ which is within the rating of $Q_1$. While $Q_1$ is drawing the initial photocurrent, $Q_2$ is completing its turn-on process. Since $Q_2$ is a high-power device, it is much slower in turning-on but it is capable of carrying a larger steady state current than $Q_1$. As $Q_2$ is being fully turned-on, capacitor $C_1$ is becoming charged and the current through $Q_1$ is dropping off. The loss in conduction by $Q_1$ is compensated for by the rise in current through $Q_2$. The photocurrent flow through transistor $Q_2$ is illustrated in FIG. 3 as $IQ_2$.

In comparison, the current rise time for $Q_1$ shown in FIG. 3 is much faster than transistor $Q_2$ rise time. However, the composite curve for $Q_1$ and $Q_2$ illustrated in FIG. 3 indicates that there is a very rapid rise time and high current produced through the photocurrent diverter circuit. This rapid rise time is the result of the particular combination of one low power, fast turn-on transistor and one high power, slow turn-on transistor. The composite photocurrent drain would be observed at point 10 in the diverter circuit. The photocurrent diverter illustrated in FIG. 2 is capable of being fast enough to divert photocurrents due to radiation before such current can cause system malfunction.

Although the invention has been described with reference to a particular embodiment, it will be understood to those skilled in the art that the invention is capable of a variety of alternative embodiments within the spirit of the appended claims.

I claim:

1. A current diverter circuit comprising in combination:
    a. a first transistor for diverting an initial surge and continuing currents including a base, a collector and an emitter;
    b. a second transistor for diverting a continuing high current including a base, a collector and an emitter;
    c. input means connected to said first transistor base and to said second transistor collector;
    d. means for connecting said second transistor base to first transistor collector;
    e. power supply means having first and second terminals;
    f. a first resistor and a capacitor connected in parallel between said power supply first terminal and said first transistor collector;

g. a second resistor connected between said power supply first terminal and said second transistor emitter;

h. means for connecting said first transistor emitter to said power supply second terminal;

i. and third resistor means connected between said second transistor collector and said power supply second terminal.

2. A transistor circuit as in claim 1 wherein said first and second transistors comprise a complementary NPN-PNP transistor pair respectively.

3. A transistor circuit as in claim 1 wherein said first transistor is a low-power rated fast turn-on transistor and said second transistor is a high-power rated transistor.